United States Patent
Garnett

[19]

[11] Patent Number: 6,056,657

[45] Date of Patent: May 2, 2000

[54] CONTROL STRATEGY FOR OPTIMIZING MULTI-RANGE HYDRO-MECHANICAL TRANSMISSION

[75] Inventor: Stephen C. Garnett, Princeville, Ill.

[73] Assignee: Caterpillar Inc., Peoria, Ill.

[21] Appl. No.: 09/330,961

[22] Filed: Jun. 11, 1999

[51] Int. Cl.[7] .................................................. F16H 47/04
[52] U.S. Cl. .......................................... 475/72; 74/732.1
[58] Field of Search ............................... 74/732.1, 733.1; 475/72; 477/68, 69, 107, 111

[56] References Cited

U.S. PATENT DOCUMENTS

| | | | |
|---|---|---|---|
| 4,353,272 | 10/1982 | Schneider et al. | 74/859 |
| 4,598,611 | 7/1986 | Frank | 74/860 |
| 4,622,865 | 11/1986 | Itoh et al. | 74/866 |
| 4,727,771 | 3/1988 | Niwa et al. | 74/866 |
| 4,817,469 | 4/1989 | Shigematsu et al. | 74/866 |
| 4,947,953 | 8/1990 | Morimoto | 180/179 |
| 4,976,170 | 12/1990 | Hayashi et al. | 74/866 |
| 5,042,326 | 8/1991 | Hibi et al. | 74/866 |
| 5,201,889 | 4/1993 | Mason | 74/866 |
| 5,239,894 | 8/1993 | Oikawa et al. | 477/107 |
| 5,521,819 | 5/1996 | Greenwood | 364/424.1 |
| 5,522,775 | 6/1996 | Maruyama et al. | 475/76 |
| 5,545,106 | 8/1996 | Senger et al. | 477/43 |
| 5,575,735 | 11/1996 | Coutant et al. | 475/72 |
| 5,683,326 | 11/1997 | Inoue | 476/10 |
| 5,865,700 | 2/1999 | Horsch | 475/72 |
| 5,888,162 | 3/1999 | Moeller et al. | 475/72 |
| 5,890,981 | 4/1999 | Coutant et al. | 475/72 |

Primary Examiner—Charles A Marmor
Assistant Examiner—Ha Ho
Attorney, Agent, or Firm—Howard & Howard; Jeffery L. Myers; Kevin M. Kercher

[57] ABSTRACT

An improved method and system for operating a hydro-mechanical transmission includes varying the engine speed to achieve optimum efficiency. The engine speed and the speed of the hydraulic motor are varied to result in a combined output that maximizes efficiency at shift points.

16 Claims, 3 Drawing Sheets

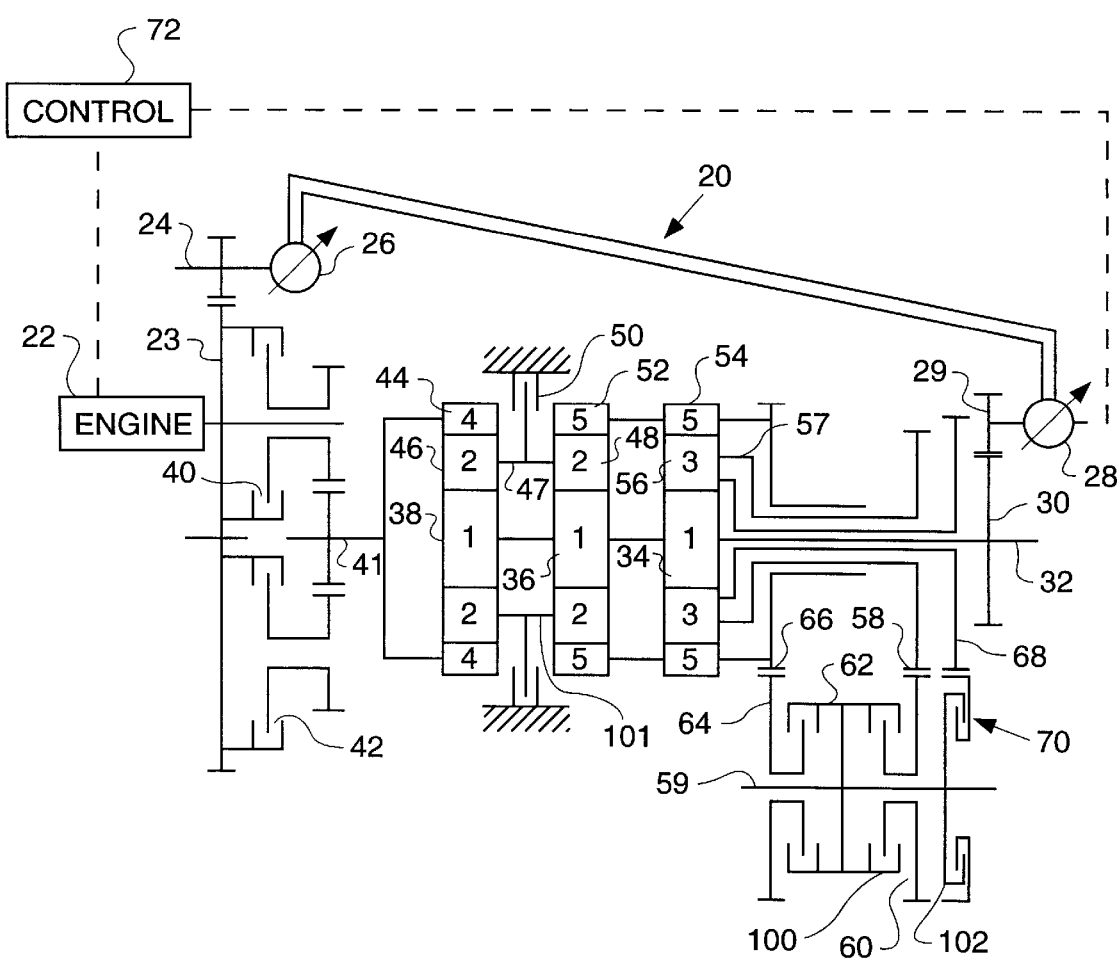

Control Strategy of Present Invention ——  Previous Control Strategy - - - -

Control Strategy of Present Inventation ——  Previous Control Strategy - - - -

CONTROL STRATEGY FOR OPTIMIZING MULTI-RANGE HYDRO-MECHANICAL TRANSMISSION

TECHNICAL FIELD

This invention relates generally to a method and control system to provide efficiency improvement for hydro-mechanical transmissions, and more particularly, to a method and system that improves the efficiency at shift points.

BACKGROUND ART

In the prior art, transmissions could be broadly grouped into two categories. In a first category, which is typically utilized on normal on-the-road machines, the transmission is shifted between a plurality of discrete mechanical gear ranges. In a second type of transmission, known as continuously variable transmissions, there is the ability to provide an infinite number of speed ratios between an input and an output shaft.

One known type of continuously variable transmission utilizes both a mechanical multi-range transmission, and a continuously variable component. In one example of this type of transmission, the input to the mechanical multi-range transmission portion is combined with an input from a hydraulic motor to result in a continuously variable output. This type of transmission is known as a hydro-mechanical transmission. Control algorithms for this type transmission have not been as efficient as would be desirable at shift points.

Hydro-mechanical transmissions provide continuously variable ratios by varying hydraulic motor speed between synchronous shift points of the mechanical mechanism. The most common control strategy used with this transmission is to vary the transmission ratio as load varies to maintain a constant engine speed. While this control strategy permits selection of an engine speed where the engine is efficient, it results in the efficiency of the transmission varying significantly from a maximum efficiency where the motor is at low speeds and most of the power is transmitted mechanically to a minimum efficiency at the synchronous shift points where the motor speed and hydraulic power are at a local maximum.

The present invention is directed to overcoming one or more of the problems set forth above.

DISCLOSURE OF THE INVENTION

In one aspect of this invention, a method of operating a hydro-mechanical transmission, having an output, a mechanical multi-speed transmission driven by an engine, and a motor providing a continuously variable reversible input to the output such that the speed of the output is developed from a combination of the multi-step transmission and the motor, is disclosed. This method includes the steps of driving the multi-step transmission by the engine, and driving the output by the combination of the multi-step transmission and the motor and approaching a desired shift point for the multi-step transmission, and then varying engine speed to result in an increase in the speed of the multi-step transmission and then shifting the multi-step transmission when the speed of the motor and the speed of the multi-step transmission are appropriate to achieve a generally synchronized shift.

In another aspect of this invention, a hydro-mechanical transmission system is disclosed. The system includes an engine input and a multi-speed transmission selectively receiving a drive input from the engine input and a hydraulic motor for selectively driving the multi-speed transmission and an output shaft from the hydro-mechanical transmission, the hydro-mechanical transmission output being affected by both the drive input from the engine input shaft, and from the motor input and a control for controlling the speed of the engine on the engine input shaft and the speed of the motor, the control being operable to increase engine speed as a shift point is approached, and to vary motor speed and engine speed, and to identify a synchronized point and shift the multi-speed transmission when motor speed and engine speed reach a synchronized point.

BRIEF DESCRIPTION OF THE DRAWINGS

For a better understanding of the present invention, reference may be made to the accompanying drawings in which:

FIG. 1 illustrates a transmission according to the present invention;

BEST MODE FOR CARRYING OUT THE INVENTION

Figure 2A:
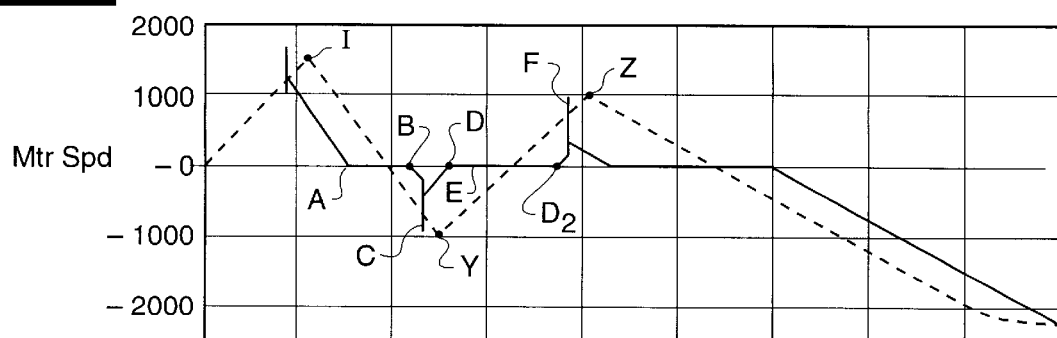
FIG. 2A is a graph showing motor speed across a range of machine speeds.

An example of a transmission which will benefit from the present Invention is shown in FIG. 1. It should be understood that while the transmission shown in FIG. 1 will benefit from this invention, other types of hydro-mechanical transmissions having both a multi-range mechanical portion and a continuously variable hydraulic portion would also benefit from the teachings of this Invention.

Transmission 20, such as that shown in FIG. 1, receives an input 23 from an engine 22. The input 23 drives a first gear 24, which in turn drives a hydraulic pump 26. The hydraulic pump 26 communicates with a hydraulic motor 28. Hydraulic motor 28 drives a gear 29 which in turn drives a gear 30. Gear 30 drives a shaft 32. Sun gears 34, 36 and 38 are fixed to rotate with the shaft 32. As known, a sun gear is a portion of a planetary transmission. A clutch 40 selectively connects the input 23 to a forward drive input at shaft 41. Alternatively, a reverse clutch 42 can drive the input 41 in the reverse direction.

Whatever is driven by the input 41 drives a ring gear 44 which surrounds planet gears 46. Planet gears 46 are connected to rotate relative to a carrier 47 with carrier 47 being connected to carrier 101. As known, the carrier 47 may rotate, and if it does the planet gears 46 and 48 will rotate with it. However, the planet gears 46 and 48 can also rotate about their own axes relative to the carrier 47. A clutch 50 selectively locks the carrier 47 and carrier 101 for a purpose to be described below.

A first ring gear 52 is connected to rotate with a second ring gear 54. Ring gear 54 is associated with planet gears 56 driving a carrier 57 which is in turn associated with a drive input 58.

The gear 58 drives gear 60, which may be connected to an output 59 for the entire transmission 20 if a clutch 100 is engaged. Alternatively, the clutch 62 can be engaged such that transmission output shaft 59 is driven by gear 64. Gear 66 is driven by gear 64 and is connected to ring gear 54. In addition, a second gear 68 is connected to the carrier 57. Gear 68 drives gear 70 and gear 70 can be connected to the output shaft 59 by engaging clutch 102. Typically, the clutch 102 is left non-engaged when clutch 102 or clutch 62 are engaged. Clutch 100 is engaged to provide first and second gear, and clutch 62 is engaged to provide a third gear. Clutch 70 is engaged to provide a fourth gear. The difference in speed ratio in fourth gear compared to second gear is achieved by providing different gear teeth ratios between the gears 58 and 68 and their respective driven gears 60 and 70. This permits the output speed at shaft 59 to be higher in fourth gear compared to second gear even though the speed of carrier 57 could be the same in fourth gear and second gear.

A control 72 is shown for controlling engine speed and motor speed 28. As known, motor speed can be controlled by flow control structure, such as a valve, on the communication lines between motor 28 and pump 26.

In a low gear, shown as first gear in the corresponding drawings, the clutch 50 is locked to stop rotation of the planet carrier 47 and the planet carrier 101. If the clutch 40 is engaged, drive input from the engine would be transmitted. However, in first gear, both clutches 40 and 42 are left out of engagement while the clutch 50 to prevent rotation of the planet carrier 47 and the planet carrier 101. Input from motor 28 drives gear 29 which in turn drives gear 30 and gear 30 is connected to shaft 32, which is connected to the sun gears 34, 36 and 38. The drive input to gear 38 causes the planet gears 46 to rotate, in turn causing the ring gear 44 to rotate in an opposed direction. Since the clutch 40 is non-engaged, this does not vary the drive output.

The ring gear 52 is driven in an opposed direction to the rotation of the sun gear 36 due to the intermediate planet gears 48. Again, the planet gears 48 will rotate about their own axes, but will not orbit since the carrier 47 is locked.

The sun gear 34 and the ring gear 54 will both thus be driven. This will cause the planet gears 56, and hence planet carrier 57 to rotate. During this rotation, the gear 58 will drive the output 59, since the clutch 100 will be engaged. At some point, the system reaches a position where it is desirable to shift to second gear.

FIG. 2A shows the motor speed during low gear as a dashed line leading up to a point I. At I, the second gear is engaged. As can be seen, the motor speed increases to increase the ground speed. As can be seen from FIG. 2B, the dashed line shows the engine speed during this same period. The engine speed is maintained constant. In the previous control strategy, it was believed desirable to maintain a constant engine speed to result in the maximum efficiency. At point I, the clutch 40 is engaged and the clutch 50 is released. Engine rotation is now transmitted to the ring gear 44. The sun gear 38 is rotating in a positive direction, and subtracts from the rotation of the planet carrier 47 that would otherwise be caused by the rotation of the ring gear 44. This is also true with regard to the rotation of the ring gears 52 and 54 that would otherwise be caused by the rotation of the planet carrier 47. That is, when the motor speed is rotating in the positive direction, it will subtract from the output speed when in second gear. In many of these complex transmissions, whether the motor speed adds to the output speed when in a positive rotation direction or subtracts will vary with the particular gear speed ratio.

Thus, the speed seen at ring gear 54 due to the rotation of the input from the motor 28 and as shown in FIG. 2A between point I and point Y, is less than it would be without any input from the motor 28. As shown, once in second gear, to achieve increasing machine ground speed, the motor speed drops to a point Y on the opposed side of zero. That is, the speed of rotation of the motor initially drops toward zero. At zero, it begins to rotate in an opposed direction. When in second gear, motor rotation in the negative direction will actually add to the output speed of the output 59.

At point Y, it again becomes time to shift gears. The engine speed is maintained constant, and the gear shift is made. Essentially, the shift up to third gear is made by engaging clutch 62 and releasing clutch 100 to engage gear 64 to the output shaft 59. At this point, the output speed of shaft 59 is proportional to the speed of the ring gear 54. In this orientation, the input from the sun gear 34 is actually adding to the speed of rotation of the output 64, when the motor speed is in the positive direction such as shown in FIG. 2A. Thus, as shown between points Y and Z, with the previous control strategy, the motor speed would increase, cross zero and begin to rotate in a forward direction. As can also be appreciated from FIG. 2B, with the previous control strategy, the engine speed was constant through this range. As can also be appreciated from FIG. 2B, with the previous control strategy, the engine speed remained constant until a point very high up in the ground speed range, after all shifts were made.

The shift to fourth gear, which occurs at point Z is made by selectively engaging the clutch 70, and disconnecting the clutch 62. In fourth gear, the flow of drive is similar to second gear, but since gears 58 and 68 are associated with different gear ratios, different speed occurs.

Figure 2B:
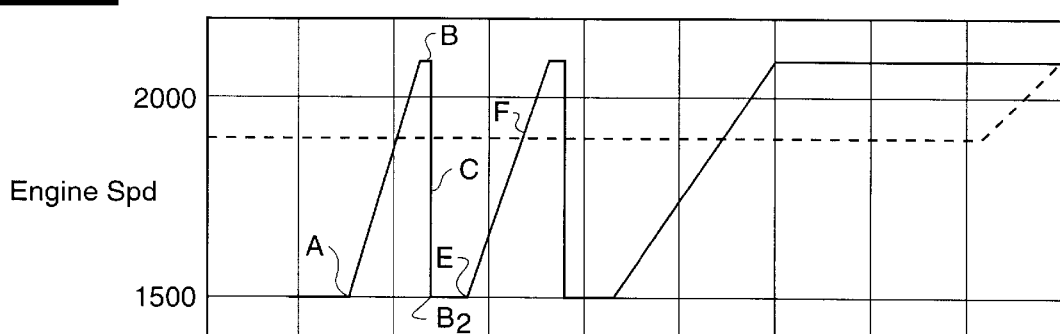
FIG. 2B shows engine speed across a range of ground speeds.
Figure 2C:
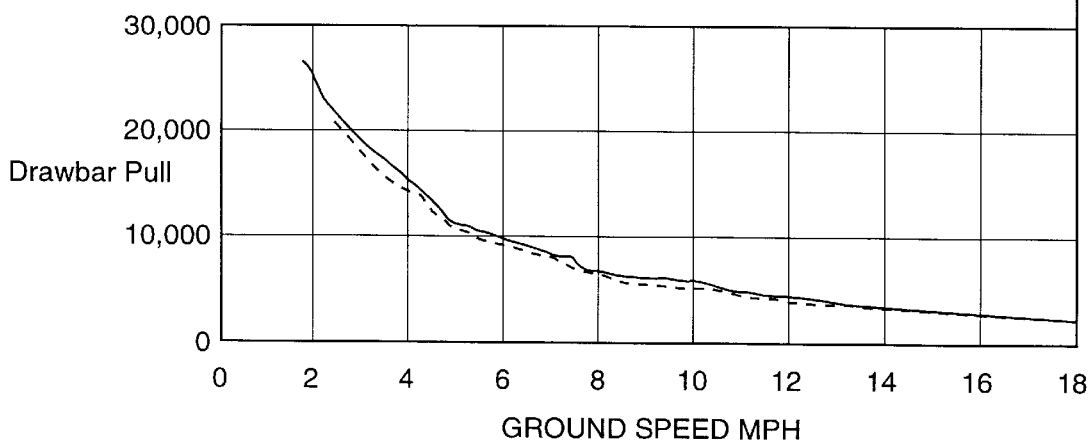
FIG. 2C shows a load on the transmission or machine across the engine and motor speed shown in FIG. 2A and FIG. 2B.

As can be appreciated from FIG. 2C, as speed increases, the load on the machine, or the pull from a draw bar, if the intended machine is an agricultural equipment drawing an implement, decreases. The graphs shown in FIG. 2A and FIG. 2B might vary if the draw bar pull was different from that illustrated in FIG. 2C. However, the general relationships should hold true.

Figure 2D:
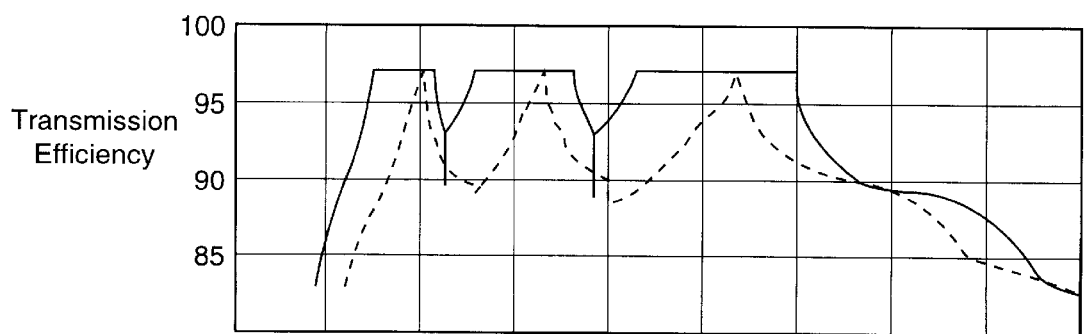
FIG. 2D shows the transmission efficiency for a number of operational points.

FIG. 2D shows transmission efficiency. The dashed line is the efficiency with the previous control strategy. As shown, there are peaks on the transmission efficiency associated with a position slightly after each transmission shift. However, there are also valleys in the transmission efficiency with the previous control strategy.

It is the goal of the present invention to improve the efficiency of the transmission operation across this normal ground speed range.

A transmission 20, as illustrated in FIG. 1, will be utilized to describe the operation of a transmission 20 with the inventive control method.

Generally, it can be recognized that the previous control strategy is inefficient. It is also evident that in the lower part of each transmission range, the transmission 20 operates most efficiently at a lower end of the engine speed for the beginning of the transmission range, and operates most efficiently at a higher end of the engine speed range as the transmission 20 approaches the higher end of the range. This results in a need for changing the engine speed from a low value to a high value as speed increases within the transmission range, and additionally, lowering the engine speed dramatically when a shift occurs. It should be recognized that minimizing the motor input over portions of the operational cycle will also increase the efficiency. Thus, the motor 28 is utilized in general to assist in affecting the engine's speed change as set forth above.

Details of this method will be described with reference to one particular set of circumstances in graphical form. However, it must be recognized that the invention is broader and would apply to different types of transmissions in different sets of circumstances. What is shown in the following disclosure is an example of one particular controlled algorithm for operating the system.

When in first gear, motor speed alone drives the transmission 20. Thus, as shown in solid line in FIG. 2A, the motor speed can increase upwardly to a point I. The motor speed is slightly over 1,000 in a positive rotational direction at that point. When the transmission 20 initially shifts to second gear, the motor speed begins to drop toward zero, according to the present algorithm. Again, it should be recognized that it is desirable to maintain the motor speed at zero whenever possible. As described above, as the motor speed decreases, a constant engine speed will still result in increasing output speed when the transmission 20 is in second gear. Approximately at point A, the motor speed reaches zero. The motor speed is maintained at zero for a period of time. The ground speed continues to increase, since engine speed is now moved upwardly toward a point B. At point B, the engine speed has reached its maximum within the desired constant power range. At this point motor speed needs to move away from zero.

At some point near this start up of a motor speed change, the control 72 will recognize that a shift is desirable. The control 72 will be provided with a look-up table, or the ability to calculate the desired shift points. Essentially, the control 72 will be able to determine when efficiency would be increased by shifting to the next higher gear. When that information is initially gathered, it must be gathered for each type of transmission and the machine upon which it is mounted. Issues such as motor speed, torque, and so forth, will all play a hand in identifying appropriate shift points. At some point, the control 72 will recognize that the efficiency would be better at the next highest gear. At that point, the control 72 begins to bring about a transmission shift. Applicant has discovered by maintaining motor speed at the minimum speed magnitude, efficiency is maximized. At the slower ground speeds achievable within a transmission range this accomplished by operating the engine at higher speeds. For the output speeds toward the center of the range of speeds achievable in a transmission range it is possible to operate the engine at a sped where motor speed is zero.

As can be appreciated from FIG. 2B, the engine speed is maintained at this speed for a short period of time. During this period the motor speed moves to the negative rotational direction. When in second gear, a negative rotational direction will increase the output speed of the output shaft 59. Motor speed continues to drop downwardly to a point C. At some point along that movement, the engine speed also begins to drop. Thus, point C is shown to be somewhere down between points B and B2 on the graph of FIG. 2B. The transmission shift to third gear would occur at some point during this downward movement of engine speed.

The control 72 is provided with the synchronized points in a memory. The synchronized points would be developed based upon the particular gear ratios, and so forth, associated with the prior gear and the future gear as well as incorporating the input speed and the output speed. Again, this information will be developed for the particular machine and transmission. As will be outlined below, when a synchronized point is reached, the shift then occurs.

As can also be appreciated from FIG. 2A, at some point along the graph and after point C, the motor speed magnitude begins to decrease and move again toward zero. The motor speed again reaches zero at point D. Point D is after the transmission 20 has shifted into third gear. As shown by solid line, the motor speed is maintained at zero once it reaches zero from point D to point D2. At some point during this operational period, the engine speed begins to increase from point E upwardly toward point F. At point D2, the engine speed will be at its maximum desired value and the motor speed will need to increase to increase output speed. Again, control 72 will recognize that a shift is now desirable. In third gear, rotation of the motor in the positive direction will again be additive to the transmission. Thus, the increasing motor speed also helps to increase the ground speed. At a point F, the control again recognizes that the shift point has been reached and that a synchronized shift can be achieved. The shift then occurs.

In general, the present invention discloses a method wherein engine speed and sometimes motor speed are varied to achieve an increased efficiency. As shown in FIG. 2D, the solid line efficiency is much higher than the previous control strategy, and is maintained at a relatively constant high point over a greater range of ground speeds. Attendant to each of the shift points, there is a slight dip, but the dip is not as pronounced, or as long-lasting as the dips that occurred with the previous control strategy. Essentially, the improvement to efficiency from the present invention is the area between the dashed line and the solid line.

The dips are associated with the influence of the motor on the output. As mentioned above, it is most desirable to maintain the motor speed magnitude at a minimum to increase efficiency. However, to achieve a synchronized shift smoothly and quickly into the next gear, it is necessary to alter the motor speed. Thus, while the motor speed influence might lower efficiency over a very limited period of time, it is desirable for the overall operation of the transmission 20.

Figure 2E:
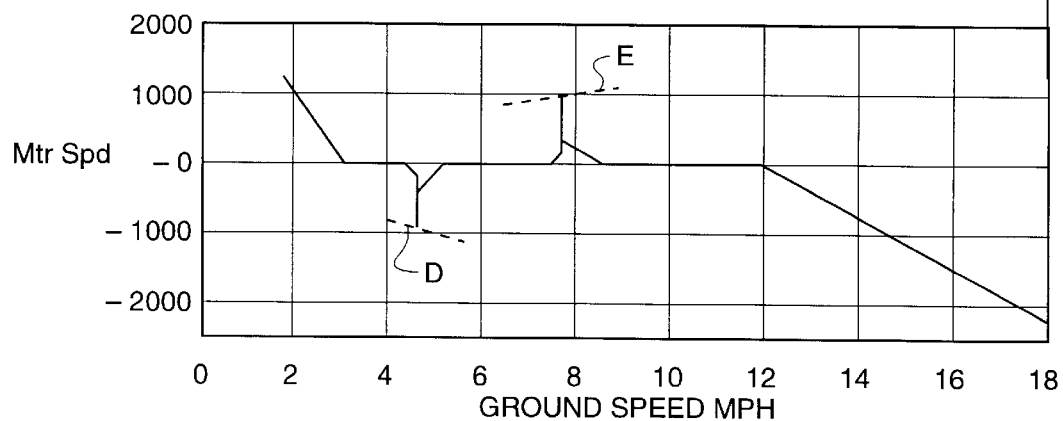
FIG. 2E is a graph showing shift points for utilizing the present control method.

As shown in FIG. 2E, the shift points D and F can be stored in graphical form, and when the motor speed crosses this line the shift can occur since the synchronized operation has been achieved.

Of course, various modifications of this invention would come within the scope of the invention. The main fundamental concept is to vary the engine speed during operation of a hydro-mechanical transmission, and to vary the motor speed as necessary to achieve increased efficiency. The efficiency is particularly increased at transmission shift points.

Industrial Applicability

With the inventive method and system, the efficiency of a hydro-mechanical transmission is improved at shift points. By controlling the engine speed and the motor speed as the shift points are approached, an overall efficiency increase is achieved across the shift points. In addition, the engine speed is increased when varied at an approaching shift point, and continues to be increased until a high desired engine speed level is reached. The motor speed is maintained at zero through this increasing engine speed, and is varied once the engine speed reaches the high constant level.

The description given above discloses the currently preferred embodiments of this invention. Variations and modifications to the disclosed embodiments may become apparent to those skilled in the art that do not necessarily depart from the purview and spirit of this invention.

Other aspects, objects and advantages of the present invention can be obtained from a study of the drawings, the disclosure and the appended claims.

What is claimed is:

1. A method of operating a hydro-mechanical transmission system, including a hydro-mechanical transmission having an output, a mechanical multi-speed transmission driven by an engine, and a motor providing a continuously variable reversible input to said output such that the speed of said output is developed from a combination of said multi-speed transmission and said motor, comprising the steps of:

driving said multi-speed transmission by said engine, and driving said output by the combination of said multi-speed transmission and said motor;

approaching a desired shift point for said multi-speed transmission, and varying engine speed to result in an increase in the speed of said multi-speed transmission, with a control; and shifting said multi-speed transmission when the speed of said motor and the speed of said multi-speed transmission are appropriate to achieve a generally synchronized shift, with said control, wherein said control is operable to increase the engine speed as a shift is approached, and to vary the motor speed and the engine speed, and shift said multi-speed transmission when the motor speed and the engine speed reach a synchronized point.

2. The method as recited in claim 1, wherein said motor speed is minimized over portions of the operation of said transmission.

3. The method as recited in claim 1, wherein said control for said system incorporates desired shift points for a plurality of motor speed and engine speed combinations which will result in an appropriate synchronized shift.

4. The method as recited in claim 1, wherein said step of varying of engine speed includes increasing engine speed, and continuing until a high desired engine speed is reached, and said motor speed is maintained at zero through this said increasing engine speed, said motor speed beginning to be varied once said engine speed reaches a high constant level.

5. The method as recited in claim 4, wherein said engine speed then begins to drop, and a transmission shift occurs while said engine speed is dropping.

6. The method as recited in claim 1, wherein said hydro-mechanical transmission is of the type wherein the contribution of said motor speed as being additive or subtractive changes in succeeding ones of said multi-speed transmissions.

7. A hydro-mechanical transmission system comprising:

an engine input;

a multi-speed transmission selectively receiving a drive input from said engine input;

a hydraulic motor for selectively driving said multi-speed transmission;

an output shaft from said hydro-mechanical transmission, said hydro-mechanical transmission output shaft being effected by both said drive input from a engine input shaft, and from a motor input; and a control for controlling the speed of said engine on said engine input shaft, and the speed of said motor, said control being operable to increase said engine speed as a shift point is approached, and to vary said motor speed and said engine speed, and to identify a synchronized point and shift said multi-speed transmission when said motor speed and said engine speed reach a synchronized point.

8. The system as recited in claim 7, wherein said multi-speed transmission is of a type wherein the contribution of motor speed alternates being additive and subtractive to the engine speed in succeeding ones of said multi-speed transmissions.

9. The system as recited in claim 8, wherein there are a series of clutches for selectively connecting various ones of said motor and said multi-speed transmission to said output shaft to achieve additive and subtractive engine speeds.

10. The system as recited in claim 7, wherein a planetary gear set selectively connects said multi-speed transmission to said output shaft.

11. The system as recited in claim 7, wherein said control minimizes motor speed over portions of the operation of said transmission.

12. The system as recited in claim 7, wherein said control incorporates desired shift points for a plurality of motor speed and engine speed combinations which will result in an appropriate synchronized shift, and said control being operable to affect each shift when said points are reached.

13. The system as recited in claim 7, wherein said control is operable to increase said engine speed, and to continue to increase said engine speed until a high desired engine speed is reached, said motor speed being maintained at zero through said increasing engine speed, said control being programmed such that said motor speed begins to be varied once said engine speed reaches a high constant level.

14. The system as recited in claim 13, wherein said control being programmed to drop said engine speed after said motor speed begins to be varied, and said control being operable to affect a transmission shift while said engine speed is dropping.

15. A hydro-mechanical transmission system comprising:

an engine input;

a multi-speed transmission selectively receiving a drive input from said engine input;

a hydraulic motor for selectively driving said multi-speed transmission;

an output shaft from said hydro-mechanical transmission, said hydro-mechanical transmission output being affected by both said drive input from an engine input shaft, and from a motor input, said multi-speed transmission being of a type wherein there are planetary gear sets selectively connecting said hydraulic motor and said multi-speed transmission to said output shaft, and a plurality of clutches, such that the contribution of a motor speed alternating between being additive and subtractive to an engine speed and succeeding ones of said multi-speed transmissions; and a control for controlling the speed of said engine on said engine input shaft, and the speed of said motor, said control being operable to increase said engine speed as a shift point is approached, and to identify a synchronized point and shift said multi-speed transmission when said motor speed and said engine speed reach a synchronized point, said control further being operable to minimize said motor speed over portions of the operation of said transmission, and said control incorporating desired shift points for a plurality of motor speed and engine speed combinations which result in an appropriate synchronized shift, said control being operable to affect a shift when said shift points are reached.

16. The system as recited in claim 15, wherein said control minimizes said motor speed over said portions of the operation of said transmission.

* * * * *

UNITED STATES PATENT AND TRADEMARK OFFICE
CERTIFICATE OF CORRECTION

PATENT NO. : 6,056,657
DATED : May 2, 2000
INVENTOR(S) : Stephen C. Garnett

It is certified that error appears in the above-identified patent and that said Letters Patent is hereby corrected as shown below:

Column 7, line 20, add --point --after the word "shift".

Signed and Sealed this

Twenty-seventh Day of February, 2001

Attest:

NICHOLAS P. GODICI

Attesting Officer     Acting Director of the United States Patent and Trademark Office